Sept. 15, 1959

W. H. KAHL 2,903,859

PROCESS AND APPARATUS FOR SEPARATING GAS MIXTURES

Filed Sept. 22, 1955

INVENTOR.
WALTER H. KAHL
BY
Thomas J. O'Brien
ATTORNEY

United States Patent Office 2,903,859
Patented Sept. 15, 1959

2,903,859
PROCESS AND APPARATUS FOR SEPARATING GAS MIXTURES

Walter H. Kahl, Grand Island, N.Y., assignor to Union Carbide Corporation, a corporation of New York Application September 22, 1955, Serial No. 535,916

6 Claims. (Cl. 62—18)

This invention relates to an improved process and apparatus for the low temperature separation of low boiling point gas mixtures, such as air, for example, into their constituents, and it particularly concerns improvements in such process and apparatus advantageous for continuous and safe operation for extended periods. Such improvements are especially effective for unattended or automatic operation.

Conditions exist in the operation of low temperature gas separation plants that require a high degree of care to insure long periods of steady production with safety and efficiency. For example, a practical difficulty is the contamination of the system by impurities carried into the system with the gas to be separated. Even though the preparation of the air for feeding to the rectifying column includes the customary treatments for removal of these impurities, some residual contaminants in minute quantity pass to the column. The regular build-up of such residual contaminants, such as $CO_2$ and $H_2O$ in air separation plants, requires frequent thawouts to prevent clogging of the heat exchange surfaces, and accumulation of hydrocarbon contaminants at so-called "dead ends," such as the oxygen reboiler of the rectification column of an air separation system, also requires a periodic or continuous wasteful draining of the boiling oxygen and periodic thawing of such column to avoid explosive hazards.

It is, therefore, the general object of the present invention to make possible the low temperature separation of gas mixtures in plants safely and efficiently for extended periods without requiring a high degree of human attention and skill.

A more particular object of the present invention is to provide a process and apparatus for low temperature separation of a gas mixture in which contaminants tending to accumulate in a reboiler are continuously removed from the reboiler liquid so as to prevent hazardous or detrimental concentrations of such contaminants.

These and other objects, features and advantages of the present invention will become apparent from the following description of the accompanying drawings, in which.

Figure 1:
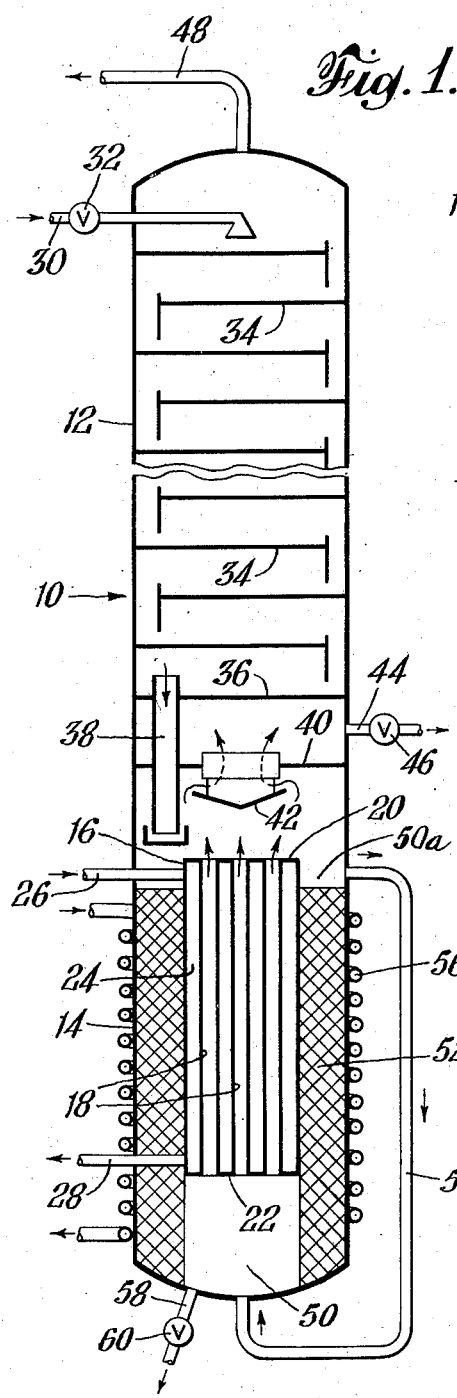
Fig. 1 shows an exemplary fractionating column portion of an air separation system embodying the present invention.

Fig. 1 of the drawing illustrates an exemplary fractionating column 10 which, for example, may serve as a product-producing interchanger for a single stage rectification or as a low pressure stage for a two-stage rectification. The invention is described with reference to an air separation plant producing oxygen and nitrogen products but it is not limited thereto; however, it is applicable generally to reboilers which evaporate a liquid containing a contaminant which tends to accumulate in the liquid over a period of operation to a point that hazardous or detrimental concentrations may be reached. The fractionating column 10 includes a rectification section 12 and a reboiler section 14 at the lower part of the column.

The reboiler includes an evaporator-condenser 16 which is formed by a plurality of tubes 18 that extend upwardly between a pair of header plates 20 and 22, which together with the side walls of the evaporator-condenser enclose the space between the header plates and about the tubes and form a condensing chamber 24. The fluid to be condensed, which may be the nitrogen-rich vapor fraction of the high pressure stage in a two-stage rectification or precooled air at a condensing pressure in the case of a single stage rectification, is introduced into condensing chamber 24 through a conduit 26 leading to an inlet port at the top of the chamber and is withdrawn from chamber 24 through a conduit 28 leading from a liquid outlet at the bottom of the chamber. The fluid passed into the condenser chamber is under pressure and has a higher boiling point at said pressure than the liquid passing through tubes 18 at lower pressure; such fluid is accordingly condensed by such liquid while at the same time evaporating the latter. At least part of the condensed fluid from the chamber 24 is passed to the top of the fractionating column 10 through a conduit 30, the high pressure liquid being throttled to a lower pressure by a throttle valve 32 in conduit 30 before it is delivered into the column.

The liquid in the rectifying section 12 descends and contacts rising vapors on liquid contact surfaces 34, which may be trays, for example, and becomes increasingly richer in oxygen content as it passes downwardly toward the bottom of the column. This liquid is led from the lowermost tray of the column, indicated schematically at 36, through a downspout 38 into the reboiler section 14. The downspout is shown passing through a liquid separator 40, which has an attached deflector 42 and which may be positioned across the fractionating column between the lowermost tray 36 and the top of the evaporator-condenser 16 for separating liquid from the vaporized liquid passing from the vaporizer tubes 18 upwardly through it to the rectifying section 12. Oxygen-rich liquid draining downwardly through the downspout 38 is passed in a manner described herebelow into the bottoms of the tubes 18 and is vaporized by heat exchange with the condensing fluid on the shell side of the tubes; part of this vapor is withdrawn from the rectification apparatus as oxygen-product through conduit 44 having a control valve 46 therein, and the remainder passes upwardly through the separator 40 into the rectifying section 12 to provide refluxing vapor for the rectification. The nitrogen product of rectification leaves the rectifying section 12 through a conduit 48 connected to the top of the column.

It has been found that notwithstanding the purifying steps employed in the preparation of air for rectification, residual carbon dioxide and hydrocarbons invariably find their way into the rectifying chamber and accumulate in the oxygen-rich liquid reboiler 14, for there occurs at this point in the system a liquid body which constitutes a "dead-end" point. Such impurities become concentrated over an extended period of operation and gradually precipitate out to form solids which could easily become an explosive hazard if they were not removed periodically. The deposits also interfere with heat exchange and reduce efficiency thereof. Removal of such solids normally requires a shutdown of the rectification apparatus and thereby results in loss of otherwise valuable productive operating time.

By the principles of this invention, residual contaminants entering the oxygen-rich liquid reboiler 14 are continuously removed from the reboiler liquid without requiring shutdown of the rectifying apparatus, without the expenditure of appreciable energy in excess of that normally required to operate the system, and without increasing appreciably the bulk of the system by additional expensive apparatus. For this purpose, the reboiler 14 is constructed to utilize a "priming" effect available in a tubular vaporizer having upwardly extending vaporizing passages for providing a positive and continuous circulation of reboiler liquid through an adsorbent which is preferably located within the fractionating column. It is to be understood that the adsorbent trap could also be located without the column, as in Fig. 2. In the preferred form shown in Fig. 1, this is accomplished by disposing the evaporator-condenser in inwardly spaced relation to the side and bottom walls of the column so as to form between such walls and its outer side and bottom walls an oxygen-rich liquid reservoir 50 having an annular section 50a which surrounds the evaporator-condenser 16 laterally and which is open upwardly to receive oxygen-rich liquid delivered into the reboiler section through downspout 38 and oxygen-rich liquid overflowing the vaporizer tubes 18. It will be evident that at static conditions, equal liquid levels would be established, by gravity flow, in the vaporizer tubes 18 and the reservoir 50 into which the bottom ends of the tubes open, and that during rectification, under the vigorous boiling action in the tubes, the liquid in the tubes is displaced upwardly with increasing velocity so that it is ejected from the upper ends of the tubes. The unevaporated liquid falls into the annular section 50a of the reservoir 50 and its outward deflection may be assisted by cone-shaped baffle 42. The liquid in the reservoir will flow into the tubes through the bottoms thereof to replace the upwardly displaced liquid. Oxygen-rich liquid in the reboiler 14 is thereby continuously recirculated alternately through the reservoir and vaporizer tubes 18.

The adsorbent is positioned in this recirculation path and may comprise an annular bed 52 of an adsorbent material, such as silica gel, for example, which is disposed in an annular section 50a across the breadth of the chamber and in position to be traversed by all the liquid passing through this section of the reservoir. Impurities in the reboiler liquid are separated from the liquid and accumulated by the adsorbent without hazard over long periods of operation.

The present utilization of a "priming" type of vaporization not only takes advantage of a driving force available in the reboiler itself for recirculating reboiler liquid continuously through a body of adsorbent, but it also takes advantage of other features peculiar to this method of vaporization which enhance the effectiveness of the impurity removal. For example, hydrocarbon impurities tend to accumulate at localized stagnation points in heat exchange passages which usually result from deposits of carbon dioxide. Moreover, once an obstruction to flow begins to build up in any heat exchange passage, circulation is diminished through this passage and increases the flow through the other passages. However, by use of a proper recirculation rate, the carbon dioxide impurities can be controlled to the extent that deposition thereof on heat exchange surfaces can be eliminated and uniform distribution of reboiler liquid through all the passages of the heat exchanger can be maintained. It has been found that a recirculation rate sufficient for carbon dioxide control is more than adequate for control of hydrocarbon impurities in the reboiler liquid. A recirculation rate of 4 to 10 times the vaporization rate is preferred in the practice of the present invention for maintaining carbon dioxide control. The scouring action available with such recirculation is sufficient to provide substantially self-cleaning of the heat exchange passages. By the present disclosure, therefore, the reboiler surfaces are maintained free and clear of carbon dioxide deposits while at the same time eliminating dangerous concentrations of hydrocarbons in the reboiler; the interchanger column can accordingly be operated for longer periods with safety and a minimum of attention.

In order to insure a steady feed of liquid in the vaporizer tubes 18, an overflow line 54 is provided which opens at one end into the side wall of reservoir section 50a at a level above the adsorbent bed 52 and which connects at its other end directly with the lower ends of the tubes 18 through a bottom portion of the reservoir 50 that is unoccupied by adsorbent medium. In this way, if the rate of boiling increases to an extent that liquid flows into the top of reservoir section 50a at a rate exceeding the rate at which it can flow through the adsorbent bed, excess liquid is passed around the adsorbent bed through by-pass 54 and delivered directly to the bottom of the vaporizer tubes 18 via the lower portion of the reservoir 50. This provides a safeguard for insuring the high recirculation rate necessary for carbon dioxide control and for also preventing an increase in the hydrostatic head on the reboiler.

An outlet 58 from the reservoir 50 having a valve 60 therein permits draining of the reservoir liquid during thawing. The adsorbent trap 52 may be regenerated during thawing by passing a hot fluid through chamber 24, preferably via inlet 26 and outlet 28, in heat exchange relation with the adsorbent or, alternatively, by heating the trap by hot coil wrapped therearound, as at 56. The coil may either be an electric coil or a conduit through which a hot fluid may be passed.

Figure 2:
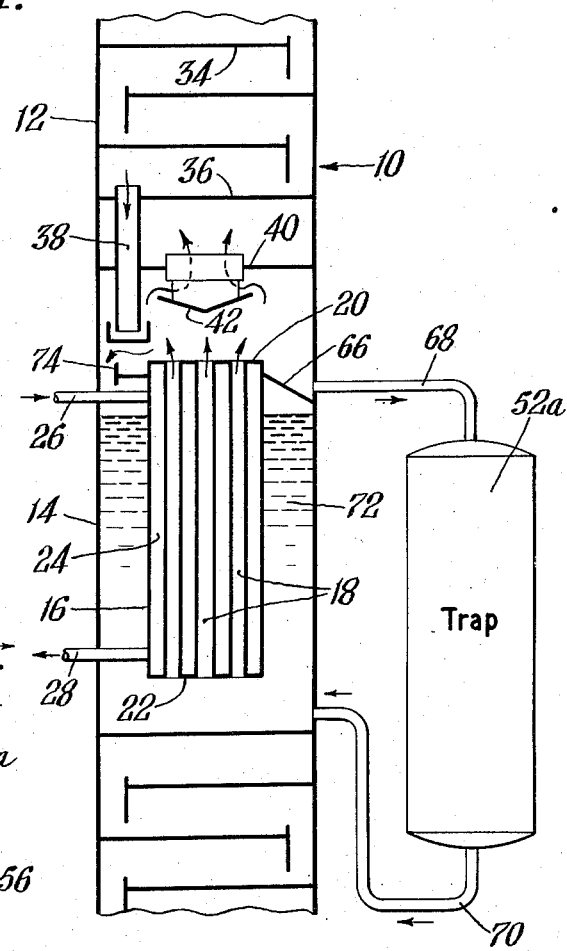
Fig. 2 shows a fragmentary view of a fractionating column, showing another embodiment of the invention.

With reference now to Fig. 2 of the drawings in which parts corresponding to similar parts of Fig. 1 are identified by the same reference numerals, there is shown a fractionating column 10 having a rectification section 12 and a reboiler section 14 with an evaporator-condenser 16 similar to those of Fig. 1. In this embodiment, however, the adsorbent trap 52a is located outside the column. For this purpose a liquid collector shelf 66 is disposed in the reboiler near the top of the vaporizer tubes 18 to receive primed liquid flowing out of the tubes. A conduit 68 drains liquid from the shelf 66 and passes it through the adsorbent trap 52a, which has an adsorbent bed therein serving the same function of the adsorbent bed of Fig. 1. Cleaned liquid flows by gravity flow through conduit 70 from the trap into a reservoir 72 surrounding the evaporator-condenser 16. A weir 74 associated with shelf 66 leads directly to the reservoir 72 so as to permit liquid overflowing shelf 66 to by-pass the trap 52a and flow directly into the reservoir when the trap cannot pass liquid back to the reservoir as fast as it is being primed onto the shelf 66.

The apparatus and method described above provides safe and reliable operation over long periods of time with a minimum accumulation of impurities in critical components of a gas separation system. Changes in the details of construction disclosed herein may be made without departing from the scope of the invention as defined in the appended claims.

What is claimed is:

1. Apparatus for the low temperature separation of a gas mixture by rectification, comprising a reboiler including a vaporizer for receiving and evaporating a liquid, means for introducing a warm fluid in heat exchange relation with liquid in the vaporizer for boiling such liquid, a first fluid connection for passing liquid from an upper portion of the vaporizer back to a lower portion thereof by gravity flow as liquid in the vaporizer is displaced upwardly by the boiling action therein, thereby effecting a circulation of unevaporated liquid through said first fluid connection, an adsorbent body in said first fluid connection positioned to be traversed by liquid circulating therethrough for removing residual impurities in such liquid, and a second fluid connection for passing excess liquid above a predetermined level in the first fluid connection around said adsorbent body directly to the bottom portion of the evaporator.

2. Apparatus for the low temperature separation of a gas mixture by rectification in a rectifying column, comprising a reboiler for receiving a component liquid from the rectifying column, an evaporator-condenser in said reboiler having a plurality of upwardly extending vaporizer channels receiving component liquid into the lower ends thereof, means for passing a warm fluid about the outsides of such channels for boiling component liquid in the channels, a header at the bottom of the evaporator-condenser into which the lower ends of the channels open, a first fluid connection within the column for receiving component liquid from said rectifying column and from the top ends of the channels and for delivering, by gravity flow, such liquid to the header, an adsorbent body in said first connection positioned to be traversed by liquid passing through such connection for removing residual impurities in such liquid, and a second fluid connection having one end opening into said header and having its other end in free communication with said first connection at a predetermined level above said adsorbent body so as to pass excess liquid above said level in the first fluid connection around said adsorbent body directly to said header.

3. Apparatus for the low temperature separation of a gas mixture by rectification in a rectifying column, comprising a reboiler for receiving a component liquid from the rectifying column, an evaporator-condenser in said reboiler having a plurality of upwardly extending vaporizer channels for receiving such component liquid into the lower ends thereof, means for passing a warm fluid about the outsides of such channels for boiling such component liquid in the channels, said evaporator-condenser being spaced inwardly from the walls of the column to form between such walls and the evaporator-condenser a reservoir, said reservoir forming at its lower portion a header into which the bottom ends of said channels open and itself being open upwardly to receive component liquid from said rectifying column and from the top ends of said channels, and said reservoir having an adsorbent body disposed therein in position to be traversed by liquid circulated therethrough for removing residual impurities in such liquid.

4. In a system for the low temperature separation of a gas mixture by liquefaction and rectification wherein a liquid of the rectification is continuously reboiled by heat exchange with a warmer fluid, the steps including priming reboiler liquid above the confines of the heat exchange zone, passing by gravity flow liquid lifted above said heat exchange zone by said priming through an adsorbent body, thereafter delivering by gravity flow the cleansed liquid to a lower region of the heat exchange zone for boiling, and, when the rate of liquid downflow exceeds the rate at which liquid can flow freely through the adsorbent body, passing excess liquid around the adsorbent body directly to such lower region of the heat exchange zone.

5. Apparatus for the low-temperature separation of a gas mixture by rectification, including a reboiler for receiving a liquid, a vaporizer-condenser in said reboiler having a plurality of upwardly extending vaporizer channels receiving such liquid into the lower ends thereof, means for passing a warm fluid about the outsides of said channels in heat exchange relation with liquid therein for boiling such liquid, a first fluid connection for receiving liquid from the top ends of said channels and for delivering by gravity flow such liquid to the lower ends of said channels, an adsorbent body in said first fluid connection positioned to be traversed by liquid circulating therethrough for removing residual impurities in such liquid, and another fluid connection for passing excess liquid above a predetermined level in said first fluid connection around the adsorbent body directly to the lower ends of said channels.

6. Apparatus for the low temperature separation of a gas mixture by rectification in a rectifying column comprising a reboiler for receiving a component liquid from the rectifying column, an evaporator-condenser in said reboiler having a plurality of upwardly extending vaporizer channels receiving component liquid into the lower ends thereof, means for passing a warm fluid about the outsides of such channels for boiling component liquid in the channels, a header at the bottom of the evaporator-condenser into which the lower ends of the channel open, liquid collector means open to the upper ends of said channels for receiving liquid therefrom, a fluid connection outside the column for delivering, by gravity flow, liquid from said collector to said header, an adsorbent body in said fluid connection positioned to be traversed by liquid passing through such connection for removing residual impurities in such liquid, said liquid collector means having an overflow passage means leading directly therefrom to said header to pass excess liquid around said adsorbent body directly to said header.

References Cited in the file of this patent

UNITED STATES PATENTS

| | | |
|---|---|---|
| 1,891,125 | Gessel | Dec. 13, 1932 |
| 2,142,446 | Kopp | Jan. 3, 1939 |
| 2,500,136 | Ogorzaly | Mar. 7, 1950 |
| 2,514,921 | Yendall | July 11, 1950 |
| 2,615,312 | Yendall | Oct. 28, 1952 |
| 2,650,482 | Lobo | Sept. 1, 1953 |